(12) United States Patent
Furumura et al.

(10) Patent No.: US 9,857,128 B2
(45) Date of Patent: Jan. 2, 2018

(54) HEAT TRANSFER TUBE AND METHOD FOR PRODUCING SAME

(71) Applicant: Mitsubishi Aluminum Co., Ltd., Minato-ku (JP)

(72) Inventors: Hiroki Furumura, Susono (JP); Yasunori Hyogo, Izu (JP)

(73) Assignee: Mitsubishi Aluminum Co., Ltd., Minato-ku (JP)

( * ) Notice: Subject to any disclaimer, the term of this patent is extended or adjusted under 35 U.S.C. 154(b) by 0 days.

(21) Appl. No.: 14/387,990

(22) PCT Filed: Mar. 25, 2013

(86) PCT No.: PCT/JP2013/058591
§ 371 (c)(1),
(2) Date: Sep. 25, 2014

(87) PCT Pub. No.: WO2013/146686
PCT Pub. Date: Oct. 3, 2013

(65) Prior Publication Data
US 2015/0060035 A1 Mar. 5, 2015

(30) Foreign Application Priority Data

Mar. 27, 2012 (JP) .................................. 2012-072302

(51) Int. Cl.
*F28F 19/06* (2006.01)
*C22C 21/00* (2006.01)
(Continued)

(52) U.S. Cl.
CPC ............ *F28F 19/06* (2013.01); *B23K 1/0012* (2013.01); *B23K 1/012* (2013.01); *B23K 1/19* (2013.01);
(Continued)

(58) Field of Classification Search
CPC .......... F28F 1/30; B32B 15/016; B32B 15/20; C22C 21/00
(Continued)

(56) References Cited

U.S. PATENT DOCUMENTS 4,564,347 A * 1/1986 Vaughan ............... B21C 23/005
29/33 D
4,699,673 A * 10/1987 Kobayashi et al. .......... 148/693
(Continued)

FOREIGN PATENT DOCUMENTS

CN 101928861 A 12/2010
DE 10 2008 009 695 A1 9/2008
(Continued)

OTHER PUBLICATIONS

English translation of WO2009101896 document above.*
(Continued)

*Primary Examiner* — Dominick L Plakkoottam
*Assistant Examiner* — Joel Attey
(74) *Attorney, Agent, or Firm* — Oblon, McClelland, Maier & Neustadt, L.L.P.

(57) ABSTRACT

An extruded heat transfer tube with an internal passage includes a tube body made of an extruded material of an aluminum alloy having a composition that includes 0.3 mass % or more and less than 0.8 mass % of Mn; more than 0.1 mass % and less than 0.32 mass % of Si; 0.3 mass % or less of Fe; 0.06 mass % or more and 0.3 mass % or less of Ti; and Al balance including inevitable impurities, a ratio of a Mn content to a Si content, Mn %/Si %, exceeding 2.5. The extruded heat transfer tube further includes a Zn-containing layer provided directly on an outer surface of the tube body.

2 Claims, 3 Drawing Sheets

(51) Int. Cl.

| | |
|---|---|
| *C22C 21/02* | (2006.01) |
| *C22F 1/04* | (2006.01) |
| *C22F 1/043* | (2006.01) |
| *F28F 21/08* | (2006.01) |
| *B23K 1/19* | (2006.01) |
| *C23C 10/28* | (2006.01) |
| *C23C 30/00* | (2006.01) |
| *F28F 9/18* | (2006.01) |
| *B23K 1/00* | (2006.01) |
| *B23K 1/012* | (2006.01) |
| *B23K 1/20* | (2006.01) |
| *B23K 35/28* | (2006.01) |
| *B23K 35/362* | (2006.01) |
| *B23K 35/02* | (2006.01) |
| *B23K 35/365* | (2006.01) |
| *B32B 15/20* | (2006.01) |
| *F28F 1/30* | (2006.01) |
| *B32B 15/01* | (2006.01) |
| *F28D 1/053* | (2006.01) |
| *B23K 101/14* | (2006.01) |
| *B23K 101/34* | (2006.01) |
| *B23K 103/10* | (2006.01) |

(52) U.S. Cl.
CPC .......... *B23K 1/203* (2013.01); *B23K 35/0222* (2013.01); *B23K 35/0244* (2013.01); *B23K 35/0255* (2013.01); *B23K 35/0266* (2013.01); *B23K 35/0272* (2013.01); *B23K 35/28* (2013.01); *B23K 35/282* (2013.01); *B23K 35/362* (2013.01); *B23K 35/365* (2013.01); *C22C 21/00* (2013.01); *C22F 1/04* (2013.01); *C23C 10/28* (2013.01); *C23C 30/00* (2013.01); *F28F 9/18* (2013.01); *F28F 21/084* (2013.01); *F28F 21/089* (2013.01); *B23K 2201/14* (2013.01); *B23K 2201/34* (2013.01); *B23K 2203/10* (2013.01); *B32B 15/016* (2013.01); *B32B 15/20* (2013.01); *F28D 1/05366* (2013.01); *F28F 1/30* (2013.01); *F28F 2275/045* (2013.01)

(58) Field of Classification Search
USPC ......... 165/151, 153; 428/654; 148/415, 698, 148/688, 405
See application file for complete search history.

(56) References Cited

U.S. PATENT DOCUMENTS

| | | | |
|---|---|---|---|
| 5,286,316 A | | 2/1994 | Wade |
| 5,417,919 A | * | 5/1995 | Ohori et al. .................. 420/532 |
| 5,728,241 A | * | 3/1998 | Gupta et al. .................. 148/694 |
| 5,913,989 A | * | 6/1999 | Wycliffe et al. ............... 148/437 |
| 6,113,667 A | * | 9/2000 | Hyogo et al. ................... 75/255 |
| 6,708,869 B2 | * | 3/2004 | Hyogo et al. .................. 228/183 |
| 6,743,308 B2 | * | 6/2004 | Tanaka et al. ................. 148/417 |
| 7,226,669 B2 | * | 6/2007 | Benedictus et al. .......... 428/654 |
| 7,255,932 B1 | * | 8/2007 | Kilmer ........................... 428/654 |
| 7,306,890 B2 | * | 12/2007 | Ishida et al. ............... 430/270.1 |
| 7,998,288 B2 | * | 8/2011 | Suzuki et al. ................. 148/551 |
| 2002/0125004 A1 | * | 9/2002 | Kraft .............................. 165/180 |
| 2005/0189047 A1 | * | 9/2005 | Hasegawa et al. ........... 148/689 |
| 2006/0000586 A1 | * | 1/2006 | Katsumata et al. .......... 165/133 |
| 2006/0118282 A1 | * | 6/2006 | Ren et al. ...................... 165/133 |
| 2006/0151155 A1 | * | 7/2006 | Nakata .......................... 165/133 |
| 2006/0260724 A1 | * | 11/2006 | Hyogo et al. .................. 148/689 |
| 2007/0017605 A1 | * | 1/2007 | Nakamura et al. ........... 148/550 |
| 2007/0102136 A1 | * | 5/2007 | Wagstaff et al. .............. 164/487 |
| 2009/0078398 A1 | * | 3/2009 | Ueda et al. .................... 165/151 |
| 2010/0051247 A1 | * | 3/2010 | Sogabe et al. ................ 165/151 |
| 2010/0116472 A1 | * | 5/2010 | Katsumata et al. .......... 165/133 |
| 2012/0189789 A1 | * | 7/2012 | Langlais ............... B30B 11/221 428/34.1 |

FOREIGN PATENT DOCUMENTS

| | | | |
|---|---|---|---|
| EP | 1 721 998 A1 | | 11/2006 |
| JP | 56-136950 | | 10/1981 |
| JP | 7 505448 | | 6/1995 |
| JP | 2000 8130 | | 1/2000 |
| JP | 2004 330233 | | 11/2004 |
| JP | 2006-045603 A | | 2/2006 |
| JP | 2008 208416 | | 9/2008 |
| JP | 2009 249728 | | 10/2009 |
| JP | 2011 7384 | | 1/2011 |
| JP | 2012 149313 | | 8/2012 |
| KR | 10-2004-0101275 A | | 2/2004 |
| KR | 10-2011-0043221 A | | 4/2011 |
| WO | WO2009101896 | * | 8/2009 ............ C22C 21/00 |
| WO | 2011/108460 A1 | | 9/2011 |

OTHER PUBLICATIONS

Written Opinion of the International Searching Authority dated May 14, 2013 in PCT/JP13/058591 Filed Mar. 25, 2013.
International Search Report dated May 14, 2013 in PCT/JP13/058591 Filed Mar. 25, 2013.
Notice of Grounds for Rejection dated Jan. 16, 2015 in Korean Patent Application No. 10-2014-7029436 (with English language translation).
European Search Report dated May 21, 2015, in EP13768104.5.
Chinese Office Action dated Jun. 15, 2015, in CN Patent Application No. 201380027306.X (with English translation).

* cited by examiner

US 9,857,128 B2

HEAT TRANSFER TUBE AND METHOD FOR PRODUCING SAME

FIELD

The present invention relates to a heat transfer tube for a heat exchanger configured to have an excellent corrosion resistance and a method of producing the heat transfer tube.

Priority is claimed on Japanese Patent Application No. 2012-072302, filed Mar. 27, 2012, the contents of which are incorporated herein by reference.

BACKGROUND

The heat exchanger made of an aluminum alloy includes a heat transfer tube, fins, and header pipes as the major components, and is manufactured by brazing. In the manufacturing process of the heat exchanger made of an aluminum alloy, the brazing sheet, on which an Al—Si alloy brazing material is cladded, has been utilized broadly. However, in recent years, products can be manufactured with low cost by applying a brazing filler composition, which is made of a mixture of: an Al—Si alloy powder or a Si powder; a flux; and a binder, on the surface of a heat transfer tube (extruded heat transfer tube) made of an extruded material without using the blazing sheet.

However, in the case of using the above-mentioned brazing filler composition, Si concentration increases on the surface of the heat transfer tube and decreases in the internal part of the tube since Si diffuses from the surface of the extruded heat transfer tube to the internal part due to heat during brazing, causing formation of electrical potential gradient, in which electrical potential is higher on the surface and lower in the internal part, in the heat transfer tube. Due to the electrical potential gradient formed in the heat transfer tube, the heat transfer tube corrodes and formation of pitting corrosion occurs, which causes the problems of refrigerant leakage or decreased strength.

As a countermeasure of these problems, a structure with improved corrosion resistance has been proposed. In this structure, electrical potential gradient, in which the electrical potential on the surface of the heat transfer tube is low and the electrical potential in the internal part is high, is formed by forming a Zn-diffusing layer on the surface of the heat transfer tube. The Zn-diffusing layer is formed by performing mixed application of a Zn-containing flux on the surface of the heat transfer tube with Si powder and the like.

The inventors of the present invention have proposed a tube for a heat exchanger in Patent Literature 1 (PTL 1). In the tube, a brazing coating, which includes Si powder whose application amount is 1-5 g/m$^2$, and Zn-containing flux whose application amount is 5-20 g/m$^2$, is formed on the outer surface of the extruded heat transfer tube, the outer surface being jointed to fins.

According to this proposal, the Si powder melts to be brazing liquid during brazing since the Si powder and the Zn-containing flux are mixed in. Thus, Zn in the flux diffuses uniformly in the brazing liquid and spreads over the surface of the tube uniformly. Diffusion rate of Zn is significantly higher in a liquid phase such as the brazing liquid than that in a solid phase. Thus, by having this configuration, Zn concentration can be kept uniform over the surface of the heat transfer tube. Because of this, a uniform sacrificial anode layer can be formed on the surface of the extruded heat transfer tube, and corrosion resistance of the extruded heat transfer tube for a heat exchanger can be improved.

RELATED ART DOCUMENTS

Patent Literature

PTL 1: Japanese Unexamined Patent Application, First Publication No. 2004-330233

SUMMARY

Problems to be Solved by the Present Invention

However, based on the further studies by the inventors of the present invention, even if Zn concentration over the outer surface of the extruded heat transfer tube becomes uniform, selective corrosion occurs at the extrusion weld part in a heat exchanger whose extrusion heat transfer tube is thin-walled. This causes a problem of reduced corrosion resistance.

Generally, the weld line in the extruding work means the line generated by merging of two flows of softened metal in the mold when molding is performed by putting metal softened by being heated into the mold. The part of this weld line is referred as the extrusion weld part.

The inventors of the present invention found that the component elements of the aluminum alloy constituting the extruded heat transfer tube and the like are need to be examined thoroughly in order to improve corrosion resistance further in the extruded heat transfer tube, which has an extrusion weld part by being formed by extruding work and is brazed in the presence of the Zn-diffusion explained above. Also they found that the method of producing the aluminum alloy itself effects on the corrosion resistance and finally made the present invention.

The present invention is made under the circumstances described above. The purpose of the present invention is to provide: a heat transfer tube for a heat exchanger whose main body is the extruded tube with excellent corrosion resistance and extrudability; and a method of producing the heat transfer tube.

Means to Solving the Problems

An aspect of the present invention is a heat transfer tube including: a tube body made of an extruded material of an aluminum alloy having a composition including: 0.3 mass % or more and less than 0.8 mass % of Mn; more than 0.1 mass % and less than 0.32 mass % of Si; 0.3 mass % or less of Fe; 0.06 mass % or more and 0.3 mass % or less of Ti; and Al balance including inevitable impurities, a ratio of a Mn content to a Si content, Mn %/Si %, exceeding 2.5; and a Zn-containing layer provided to an outer surface of the tube body.

In the heat transfer tube, the Zn-containing flux layer may be: a Zn layer; a Zn-containing flux layer; or a layer including a mixture of a Zn-containing flux, a brazing filler, and/or a binder.

In the heat transfer tube, the body of the tube may have a flat tube shape with multiple holes including multiple passage of fluid.

In the heat transfer tube, the aluminum alloy may further include: 0.05 mass % or less of Cu; less than 0.05 mass % of Mg; and less than 0.03 mass % of Cr In the heat transfer tube, 3000/mm$^2$ or less of intermetallic compound precipitates whose size is 1.0 μm or more in a circle equivalent diameter may be precipitated in the heat transfer tube after a brazing heat treatment or a Zn diffusing treatment of the heat transfer tube.

In the heat transfer tube, the aluminum alloy constituting the tube body may be an alloy of the aluminum alloy subjected to a homogenization treatment in which having a composition including: is kept at 450-650° C. for 2-24 hours.

In the heat transfer tube, a heating rate from a room temperature to 450° C. may be 50-180° C./h; a heating rate from 450° C. to a temperature of the homogenization treatment may be 10-80° C./h; and a cooling rate from the temperature of the homogenization treatment to 200° C. may be 50-400° C./h, in the homogenization treatment.

In the heat transfer tube, a brazing heat treatment or a Zn diffusing treatment may be performed on the heat transfer tube at 610° C. or lower.

In the heat transfer tube, a refrigerant flowing an inside of the heat transfer tube may be fluorocarbon.

Another aspect of the present invention is a method of producing a heat transfer tube with a tube body having a composition including: 0.3 mass % or more and less than 0.8 mass % of Mn; more than 0.1 mass % and less than 0.32 mass % of Si; 0.3 mass % or less of Fe; 0.06 mass % or more and 0.3 mass % or less of Ti; and Al balance including inevitable impurities, a ratio of a Mn content to a Si content, Mn %/Si %, exceeding 2.5; and a Zn-containing layer provided to an outer surface of the tube body, the method including the step of performing a homogenization treatment in which an ingot of the aluminum alloy having the composition is kept at a temperature of 450-650° C. for 2-24 hours after being casted.

The method of producing the heat transfer tube may further include the steps of: casting an aluminum alloy ingot from molten metal with the above-explained composition; performing the homogenization treatment; producing a body of the tube by extruding the ingot after the homogenization treatment; and providing a Zn-containing layer to the outer surface of the body of the tube.

In the method of producing the heat transfer tube, a heating rate from a room temperature to 450° C. may be 50-180° C./h; a heating rate from 450° C. to a temperature of the homogenization treatment may be 10-80° C./h; and a cooling rate from the temperature of the homogenization treatment to 200° C. may be 50-400° C./h, in the homogenization treatment.

Effects of the Invention

In the heat transfer tube, which is an aspect of the present invention, the body of the tube is constituted from the aluminum alloy extruded material including Mn, Si, Fe, and Ti in specific ranges, and the ratio of the Mn content to the Si content exceeds 2.5. Thus, when the Zn-containing layer is provided to the outer surface of the body of the tube and the heat exchanger is constituted by performing brazing to diffuse Zn, the heat exchanger with excellent corrosion resistance can be provided. Also, by the present invention, the heat transfer tube whose body is the extruded tube with excellent extrudability can be provided.

Also, in the heat transfer tube, which is an aspect of the present invention, the number of the intermetallic compound precipitates whose size is 1.0 μm or more in a circle equivalent diameter precipitated after the brazing heat treatment or the Zn diffusing treatment is limited to 3000/mm$^2$ or less. Thus, the heat exchanger having the heat transfer tube with excellent corrosion resistance can be provided.

DESCRIPTION OF EMBODIMENTS

The present invention is explained in detail below based on the embodiments indicated in the attached drawings.

Figure 1:
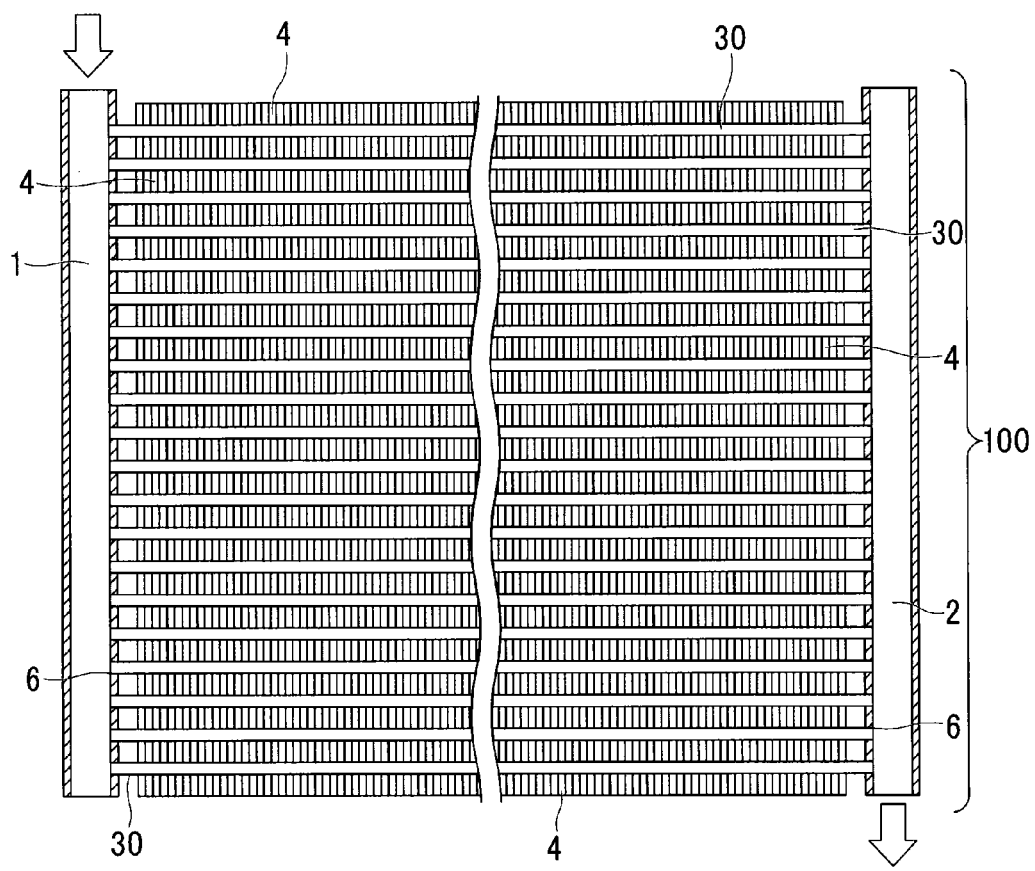
FIG. 1 A front view showing an example of a heat exchanger with the heat transfer tube related to the present invention.

FIG. 1 is a front view showing an example of a heat exchanger with the heat transfer tube related to the present invention. The heat exchanger 100 in the present embodiment is constituted mainly by: the header pipes 1, 2 placed in parallel on the right and left spaced away each other; the heat transfer tubes 30 made of flat-shaped extruded tubes, which are spaced away with an interval and in parallel each other between the header pipes 1, 2, and are jointed to the header pipes 1, 2 substantially orthogonally; and the fins 4 in a wave-shape brazed to each of the heat transfer tube 30. The bodies of the header pipes 1, 2, the heat transfer tubes 30, and the fins 4 are constituted by aluminum alloys explained later.

Figure 2:
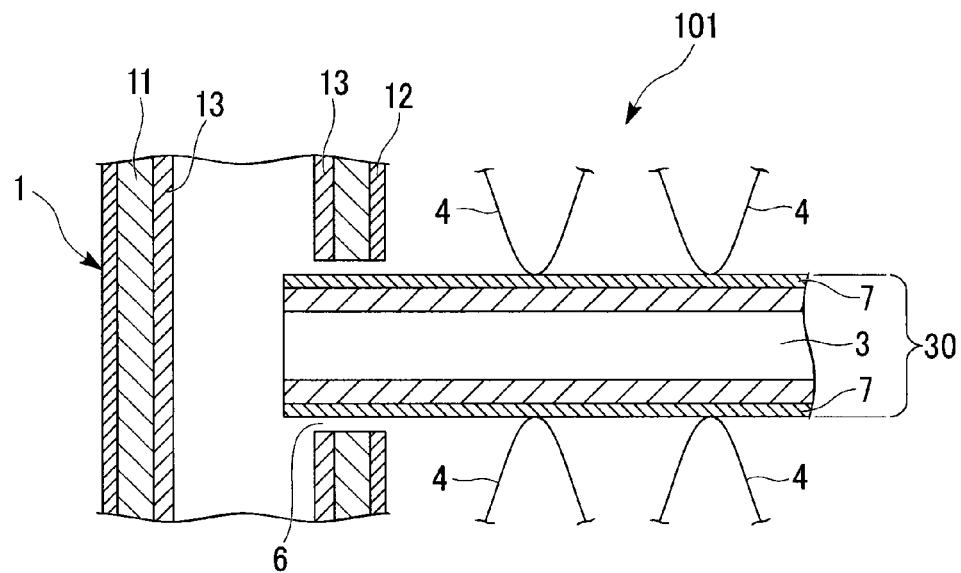
FIG. 2 A partial enlarged cross-sectional view indicating an assembled state in which header pipes, heat transfer tubes, and fins are assembled in the heat exchanger with the heat transfer tube related to the present invention.
Figure 3:
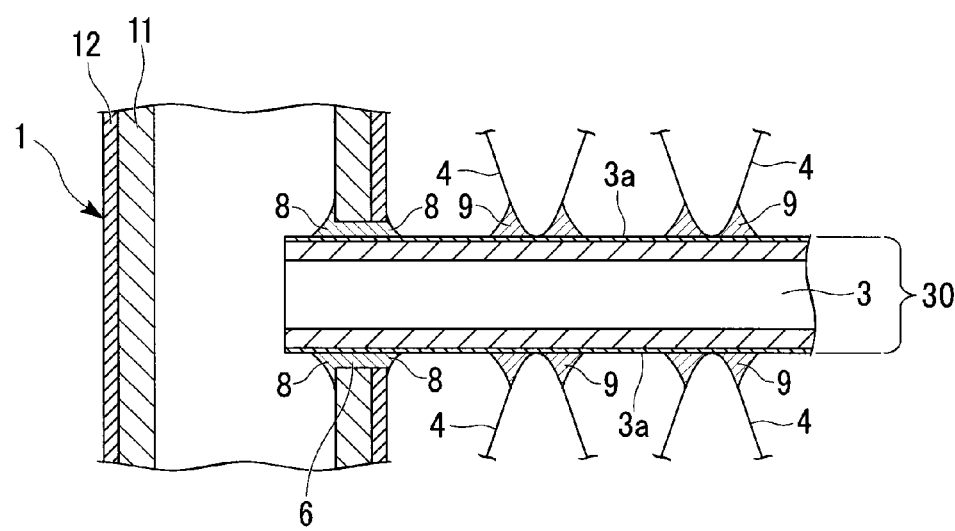
FIG. 3 A partial enlarged cross-sectional view indicating a heat exchanger, in a state where header pipes, heat transfer tubes, and fins are assembled and brazed, in the heat exchanger with the heat transfer tube related to the present invention.

More specifically, slits 6 shown in FIGS. 2 and 3 are formed on the side surfaces of the header pipes 1, 2 on their sides facing each other along the longitudinal direction of each of the header pipes 1, 2 with a constant interval. The heat transfer tubes 30 are installed between the header pipes 1, 2 by inserting the end parts of the heat transfer tubes 30 in the slits 6 of the header pipes 1, 2 facing each other. The fins 4 are placed on the front and rear surfaces of the heat transfer tubes 30 installed between the header pipes 1, 2 with a predetermined interval. These fins 4 are brazed on the front surface or the rear surface of the heat transfer tubes 30. That is, as shown in FIG. 3, the fillets 8 are formed by the brazing filler at the parts in which the end parts of the heat transfer tubes 30 are inserted in the slits 6 of the header pipes 1, 2, and the heat transfer tubes 30 are brazed on the header pipes 1, 2. Also, the fillets 9 are formed by the brazing filler at the gap parts formed by facing: the peak parts of the wave shape of the fins 4; and the closely contacting front surface or the rear surface of the heat transfer tubes 30, each other, and the fins 4 are brazed on the front and the rear surfaces of the heat transfer tubes 30.

The heat exchanger 100 of the present embodiment is produced by brazing the assembled body of the heat exchanger 101, which is configured as shown in FIG. 2 by assembling: the header pipes 1, 2; the heat transfer tubes 30 installed between the header pipes 1, 2; and the fins 4, as explained in the production method that explained later.

Figure 4:
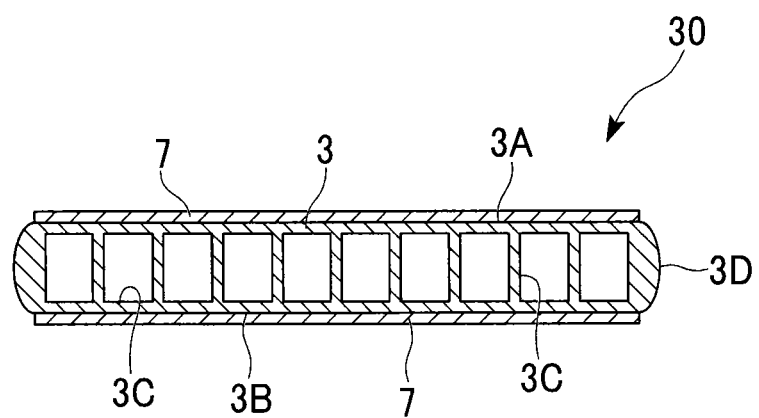
FIG. 4 A drawing indicating an example of the cross-sectional shape of the heat transfer tube related to the present invention.

To the heat transfer tubes 30 before brazing, the brazing coatings (brazing filler coating) 7, which has a blending composition of 1-6 g/m² of Si powder and 2-20 g/m² of Zn-containing fluoride compound-based flux, are formed on the front and the rear surfaces on which the fins 4 are jointed in such a way that the coating covers the large portions of the front and the rear surfaces of the tube body (extruded tube) 3 as shown in FIG. 4. As the Zn-containing fluoride compound-based flux, about 2-20 g/m² of $KZnF_3$ may be blended, or a flux blended with 2-20 g/m² of a mixture of $KZnF_3$, $K_3AlF$, and $KAlF_4$ may be used.

The brazing coatings 7 with the above-described composition may include about 0.5-3.5 g/m² of binder (such as the acryl-based resin) in addition to the Si powder and the flux.

The heat transfer tube 30 (tube body 3) in the present embodiment is an extruded tube (extrude heat transfer tube) formed by performing extruding work on an aluminum alloy. In the tube body 3, passages 3C are formed inside as shown in FIG. 4. The tube body 3 also has flat front surface (upper surface) 3A and the rear surface (lower surface) 3B, and the side surface 3D adjacent to the front surface 3A and the rear surface 3B. The tube body 3 is configured to be the flat tube with multiple holes shown in the cross section shown in FIG. 4. In the example shown in FIG. 4, there are 10 of the passages 3C formed in the tube body 3. However, the number of the passage per a tube can be chosen arbitrarily. Generally, several to several dozens of passages are formed per a tube. In an actual condition, the tube body 3 has a dimension of 1 mm-several mm of height (total thickness) and about several dozen mm of width (10-40 mm for example) as the extruded heat transfer tube. The thickness of the wall part sectioning the passages 3C has a thin structure of about 0.1-1.5 mm.

In the case where the tube body 3 with the cross-sectional shape shown in FIG. 4 is utilized and the tube body 3 is formed from the aluminum alloy with the composition explained later, the sacrificial anode layer 3a including Si and Zn is formed as shown in FIG. 3 as a result of diffusion of Si and Zn included in the brazing coating 7 on the front surface part and the rear surface part of the tube body 3 after brazing at the brazing temperature.

The composition constituting the brazing coating 7 is explained below. As the brazing coating 7, the mixture of the Si powder and the flux explained below or the mixture of the Si powder, the flux, and the binder explained below can be used.

The Si powder reacts with Al constituting the tube body 3 to form the brazing filler joining fins 4 and the heat transfer tubes 30. In this case, the Zn-containing flux and the Si powder are melted to be the brazing liquid during brazing. Zn in the flux is uniformly diffused in the brazing liquid to be spread uniformly on the surface of the tube body 3. The diffusion rate of Zn in the brazing liquid, which is in liquid phase, is significantly higher than that in solid phase. Because of this, Zn diffuses uniformly and the Zn concentration becomes substantially uniform on the surface of the heat transfer tube 30 in the plane direction.

The Zn-containing fluoride compound-based flux has an effect to form the sacrificial anode layer 3a, in which Zn that adjusts the electrical potential of the sacrificial anode layer to a lower potential properly is diffused, on the surface of the heat transfer tube 30 during brazing. Also, it has an effect to remove oxides on the surface of the tube 3 during brazing, improving the brazability by stimulating spreading property and wettability of the brazing filler.

As the Zn-containing fluoride compound-based flux, $KZnF_3$, a mixture of $KZnF_3$, $K_3AlF$, $KAlF_4$, or the like may be used.

The coating material may include binder in addition to the Si powder and the Zn-containing fluoride compound-based flux. As a suitable example of the binder, the acryl-based resin can be named.

The method for applying the brazing composition made of the Si powder, the flux, and the binder is not particularly limited in the present invention. Thus, application can be performed by an appropriate method, such as the spray method, the shower method, the flow coater method, the roll coater method, the brushing method, the dipping method, the electrostatic coating method, and the like.

Also, the application area of the brazing composition may be the entire front surface or the entire rear surface of the tube body 3. Alternatively, it may be a part of the front surface or the rear surface of the tube body 3. In short, it is acceptable if the brazing composition is applied on the front surface area or the rear surface area of the tube body 3 necessary for brazing the fins 4 at least.

The tube body 3 is made of the aluminum alloy having a composition including: 0.3 mass % or more and less than 0.8 mass % of Mn; more than 0.1 mass % and less than 0.32 mass % of Si; 0.3 mass % or less of Fe; 0.06 mass % or more and 0.3 mass % or less of Ti; and Al balance including inevitable impurities, a ratio of a Mn content to a Si content (Mn %/Si %) exceeding 2.5. The aluminum alloy may further include: 0.05 mass % or less of Cu; less than 0.05 mass % of Mg; and less than 0.03 mass % of Cr.

Reasoning for the limitations for each of the constituent elements of the tube body 3 is explained below.

{Si: More than 0.1 Mass % and Less than 0.32 Mass %}

The Si content is an important parameter for securing strength while securing corrosion resistance. When the Si content is 0.1 mass % or less, the strength becomes insufficient. When it is included at 0.32 mass % or more, extrudability of the alloy reduces due to occurrence of pickups during extruding work. Thus, the number of the intermetallic compound grain increases. Because of these, the Si content is set to more than 0.1 mass % and less than 0.32 mass %.

{Mn: 0.3 Mass % or More and Less than 0.8 Mass %}

Mn is an effective element in forming the intermetallic compound with Si and the uniform sacrificial anode layer. Also, Mn improves corrosion resistance of the tube body 3 and its mechanical strength. It is an effective element for improving extrudability during extrusion.

When the Mn content is less than 0.3 mass %, its strength becomes insufficient and corrosion resistance decreases too. When the tube body 3 includes 0.8 mass % or more of Mn, extrudability decreases due to occurrence of pickups. Thus, the Mn content is set to 0.3 mass % or more and less than 0.8 mass %.

{Fe: 0.3 Mass % or Less}

Fe is effective to secure corrosion resistance since Fe forms the intermetallic compound with Si and generates the uniform sacrificial anode layer. When the Fe content exceeds 0.3 mass %, corrosion rate (corrosion amount) increases and corrosion resistance decreases. Also, the number of the intermetallic compound grain increases. Thus, the Fe content is set to 0.3 mass % or less.

{Ti: 0.06 Mass % or More and 0.3 Mass % or Less}

Ti improves corrosion resistance and contributes to improvement of strength of the tube body 3 too. When the Ti content is less than 0.06 mass %, strength becomes insufficient and corrosion resistance reduces. When the Ti content is exceeds 0.3 mass %, the extrusion pressure of the aluminum alloy constituting the heat transfer tube increases, and extrudability decreases. Because of this, it becomes easier for the selective corrosion of the extrusion weld part to occur, reducing corrosion resistance. Thus, the Ti content is set to 0.06 mass % or more and 0.3 mass % or less.

{Cu: 0.05 Mass % or Less}

Cu suppresses corrosion rate and effective for improving corrosion resistance. However, when it exceeds 0.05 mass %, corrosion rate (corrosion amount) increases, grain boundary corrosion or selective corrosion of the extrusion weld part occurs, and corrosion resistance reduces. Thus, the Cu content is set to 0.05 mass % or less.

{Mg: 0.05 Mass % or Less}

Mg is effective for improving corrosion resistance. However, when it exceeds 0.05 mass %, selective corrosion of the extrusion weld part occurs due to reduced extrudability, and corrosion resistance reduces. Thus, the Mg content is set to 0.05 mass % or less.

{Cr: Less than 0.03 Mass %}

Cr is effective for improving corrosion resistance. However, when it exceeds 0.03 mass %, selective corrosion of the extrusion weld part occurs due to reduced extrudability, and corrosion resistance reduces. Thus, the Cr content is set to 0.05 mass % or less.

{Ratio of a Mn Content to a Si Content}

In the aluminum alloy for constituting the tube body 3 of the heat transfer tube of the present invention, it is preferable that the ratio of the Mn content to the Si content (Mn %/Si %) exceeds 2.5. When the ratio of the Mn content to the Si content is 2.5 or less, corrosion resistance reduces.

The heat transfer tube 30 of the present invention may be configured in such a way that 3000/mm$^2$ or less of intermetallic compound precipitates whose size is 1.0 μm or more in a circle equivalent diameter are precipitated after a brazing heat treatment or a Zn diffusing treatment. The precipitation amount (surface density) of the above-explained intermetallic compound can be measured as the precipitation amount on the surface of the flat part of the heat transfer tube 30 after the brazing heat treatment or the Zn diffusing treatment. The measurement can be performed by the particle analysis with an electron probe micro-analyzer (EPMA), for example.

The method for producing the above-explained heat transfer tube 30 is explained below.

It is preferable that the aluminum alloy constituting the tube body 3 is prepared by: obtaining an ingot from the molten metal of the aluminum alloy with the specified composition; and performing the homogenization treatment in which the ingot is held at 450-650° C. for 2-24 hours.

By performing the homogenization treatment, coarse precipitates are dissolved. The homogenization treatment has an effect of allowing the dissolved coarse precipitates to be dissolved in the matrix again.

It is preferable that a heating rate from a room temperature to 450° C. is 50-180° C./h; a heating rate from 450° C. to a temperature of the homogenization treatment is 10-80° C./h; and a cooling rate from the temperature of the homogenization treatment to 200° C. is 50-400° C./h, in the homogenization treatment.

Setting the heating rate ranges as described above has an effect to improve extrudability and corrosion resistance of the aluminum alloy.

Setting the cooling rate ranges as described above has an effect to improve extrudability of the aluminum alloy.

The tube body 3 can be obtained by configuring the aluminum alloy, which is treated by the above-explained homogenization treatment, in the extruded tube with multiple holes having the cross-sectional shape, for example, indicated in FIG. 4 by the direct or indirect extrusion work.

As an example of the tube body 3 produced in the present embodiment, the extruded tube with multiple holes having: width of 22 mm; height (thickness) of 1.2 mm; and 29 holes, can be mentioned. To satisfy the specification, the thickness of the boundary wall dividing the hole of the tube body 3 is about 0.2 mm. Also, the weld lines are formed in the center of the R-portion (arc portion on the side surface) of the tube body 3 and the central part in the height direction of the boundary wall dividing the hole (central part of the tube body 3 in the thickness direction).

Next, the fins 4 are explained.

For the fins 4 which are jointed to the heat transfer tube 30, the alloy mainly composed of the JIS3003 system aluminum alloy can be used, for example. Alternatively, the fins 4 that may be formed from the aluminum alloy in which about 2 mass % of Zn is added to the JIS3003 system aluminum alloy.

Fins 4 are machined into a wave shape through a hot-rolling process, a cold-rolling process, and the like after melting the aluminum alloy with the composition described above by a conventional method. The method for producing the fins 4 is not particularly limited in the present invention and any known production method can be appropriately applied. In the case where the brazing filler is not provided to the side of the heat transfer tube 30, clad fins, on which a brazing filler layer is clad-pressure-bonded, may be used. In this case, a Zn layer may be provided on the outer surface of the tube body 3 by a process such as thermal spraying of metallic zinc instead of the above-mentioned brazing coating 7. Alternatively, the Zn-containing fluoride compound-based flux or the mixture of the Zn-containing fluoride compound-based flux and the binder may be applied. As the method for applying, the same methods applied in the application method of the brazing compound may be used.

Next, the header pipe 1 is explained.

As shown in FIGS. 2 and 3 as an example, the header pipe 1 is made of the three-layered structure, which is made of: the core layer 11; the sacrificial material layer 12 provided on the outer circumference side of the core material; and the brazing filler layer 13 provided on the inner circumference side of the core material.

By providing the sacrificial material layer 12 on the outer circumference side of the core material layer 12, corrosion protection effect by the header pipe 1 can be obtained in addition to the corrosion protection effect by the fins 4. Thus, sacrificial corrosion protection effect of the tube 3 in the vicinity of the header pipe 1 can be further improved.

It is preferable that the core material layer 11 is made of an alloy based on Al—Mn-based alloy.

The sacrificial material layer 12 provided on the outer circumference side of the core material layer 11 is constituted from the aluminum alloy made of: 0.60-1.20 mass % of Zn; and the Al balance and inevitable impurities. The sacrificial material layer 12 is unified to the core material layer 11 by clad rolling.

Next, the method of producing the heat exchanger 100, which is mainly constituted by the above explained header pipes 1, 2, the heat transfer tubes 30, and fins 4, is explained.

FIG. 2 is a partial enlarged cross-sectional view of the heat exchanger assembled body 101 indicating an assembled state in which header pipes 1, 2, heat transfer tubes 30, and fins 4 are assembled using the heat transfer tube 30 in which the brazing coating 7 is applied on the tube body 3 on the joining surface with the fins 4. FIG. 2 shows the state prior to performing the heating brazing. In the heat exchanger assembled body 101 shown in FIG. 2, the end part of the heat transfer tube 30 is inserted in and attached to the slit 6 provided to the header pipe 1.

When the heat exchanger assemble body 101, which is made of: the header pipes 1, 2; the heat transfer tubes 30; and the fins 4 assembled as shown in FIG. 2, is heated to the temperature higher than the melting point of the blazing filler and cooled down after heating, the brazing coating 7 and the brazing filler layer 13 are melted and each of the header pipe 1; the heat transfer tube 30; and the fin 4, is jointed as shown in FIG. 3. In this way, the heat exchanger 100 with the structure shown in FIGS. 1 and 3 is obtained. At this time, the brazing filler layer 13 on the inner circumference side of the header pipe 1 is melted and flows in the vicinity of the slit 6 and forms the fillet 8 for the header pipe 1 and the heat transfer tube 30 to be jointed.

Also, the brazing coating 7 on the front and the rear surfaces of the heat transfer tube 30 is melted and flows in the vicinity of the fins 4 due to the capillary force and forms the fillet 9 for the heat transfer tube 30 and the fin 4 to be jointed.

In brazing, the brazing coating 7 and the brazing filler layer 13 are melted by heating at an appropriate temperature under an appropriate atmosphere such as an inert atmosphere. Because of this, the activity of the flux is increased; Zn in the flux is precipitated on the surface of the material to be brazed (tube body 3) and diffuses in the thickness direction thereof. In addition, it destroys the oxide film on the surfaces of the brazing filler and the material to be brazed; and stimulates wettability between the brazing filler and the material to be brazed.

The heating temperature for brazing is the temperature higher than the melting point of the brazing filler as explained above. When it is the brazing filler with the composition explained above, it can be heated in the range of 580-610° C. After retaining it for 1-10 minutes, it can be cooled down.

In brazing, a part of the matrix of the aluminum alloy constituting the heat transfer tube 30 and the tube body 3; and the composition of the brazing coating 7 applied to the tube body 3, are reacted to be the brazing filler material, and the heat transfer tubes 30 and the fins 4 are brazed. By performing brazing, Zn in the flux diffuses on the surface of the heat transfer tube 30.

According to the structure in the present embodiment, excellent brazing without residual Si powder can be obtained in brazing. Also, the fillet 9 with a sufficient volume is formed between the heat transfer tubes 30 and the fins 4. Also, the above-described sacrificial anode layer 3a is formed.

The heat transfer tube 30 for the heat exchanger produced as explained above is constituted from the extruded material of the aluminum alloy, in which the tube body includes Mn, Si, Fe, and Ti in the specific content ranges; and the ratio of the Mn content to the Si content exceeds 2.5. Thus, in the case where the heat exchanger is configured by providing the Zn layer or the Zn-containing layer on the outer surface side; and performing Zn diffusion by brazing, the heat exchanger with excellent corrosion resistance can be provided.

Also, when the body is the heat transfer tube 30 made of the aluminum alloy with the above-described composition, the tube body 3 with excellent extrudability can be obtained.

Next, the number of the intermetallic compound precipitates whose size is 1.0 μm or more in a circle equivalent diameter is set to 3000/mm$^2$ or less after the brazing heat treatment or the Zn diffusing treatment in the heat exchanger formed by brazing using the heat transfer tubes 30.

By limiting the number of the intermetallic compound to 3000/mm$^2$ or less, corrosion resistance can be improved.

As explained above, by using the heat transfer tube 30, which has the body made of extruded material of the aluminum alloy with the composition described above, the heat exchanger 100 with excellent corrosion resistance can be provided.

Example

After performing the homogenization treatment to the aluminum alloy ingot with the compositions indicated in Table 1, extrusion work was performed to produce the flat tubes with 29 holes with a dimension of: 22 mm of width, 1.2 mm of height (thickness).

When the homogenization treatment was performed to the aluminum alloy ingots, the heating rate between the room temperature and 450° C. was adjusted; the heating rate between 450° C. and the homogenization treatment temperature was adjusted; the homogenization temperature and time were adjusted; and the cooling rate between the homogenization treatment temperature and 200° C. was adjusted, as shown in Table 2. The test samples were obtained by producing the flat extruded tubes by using the aluminum alloys obtained in each condition.

Next, Zn thermal spray was performed on the front and rear surfaces of the flat tubes except for Examples 3, 4, and 5.

In Example 3, the KZnF$_3$ powder (D(50) granularity 2.0 μm: 10 g/m$^2$) was applied on the front and rear surfaces of the flat extruded tube.

In Examples 4 and 5, the brazing filler compositions were applied on the front and rear surfaces of the flat extruded tube.

For the brazing filler composition in Example 4, the mixture A that is a mixture of: the Si powder (D(50) granularity 4 μm: 3 g/m$^2$); and the KZnF$_3$ powder (D(50) granularity 2.0 μm: 10 g/m$^2$), was used.

For the blazing filler composition in Example 5, the mixture B that is a mixture of: the Si powder (D(50) granularity 4 μm: 3 g/m$^2$); the KZnF$_3$ powder (D(50) granularity 2.0 μm: 10 g/m$^2$); and NOCOLOK flux (trademark of Alcan Inc.) (K$_3$AlF$_3$+KAlF$_4$: 10 g/m$^2$).

The test samples of the heat transfer tubes formed by applying the Zn-containing layers on the flat extruded tubes as explained above were accommodated in the furnace under a nitrogen atmosphere, and heating treatment was performed at the temperature shown in Table 2 for 3 minutes. By the heat treatment, the sacrificial anode layers were formed on the surfaces of the heat transfer tubes.

On the heat transfer tubes after the heat treatment, the corrosion resistance test of SWAAT-20 days was performed.

The composition of the aluminum alloy; the type of the Zn-containing layer on the surface (indicated as "Types of surface Zn layer" in Table 2); the number of intermetallic compounds on the surface of the heat transfer tube after the heat treatment corresponding to brazing (#/mm$^2$); the condition of the homogenization treatment; the heating purpose; the heating temperature; and evaluations of the corrosion resistance and the extrudability, are indicated in Tables 1 and 2.

The corrosion resistance was evaluated based on the depth of the maximum corrosion (μm).

The evaluation of the extrudability was the evaluation of: the extrusion pressure; the extrusion rate; and the condition of the surface of the frat extruded tube. The evaluated product that could not be extruded due to a too high extrusion pressure and the evaluated product with a large number of surface defects such as pickups or the like were graded as the grade D (graded as a defective product). Evaluated products with almost no surface defect were graded based on the values of the extrusion pressure and the extrusion rate (the extrusion pressure being lower than the intended extrusion rate means the extrudability is better) and indicated by other grades as explained below. They were compared with the aluminum alloys 3102 and 3003. It was graded as the grade A product, if the extrudability is equivalent or better than that of 3102 alloy. It was graded as the grade B product, if the extrudability was inferior to 3102 alloy but superior to 3003 alloy. It was graded as the grade C product, if the extrudability was equivalent to 3003 alloy.

TABLE 1

|  | Mn (mass %) | Si (mass %) | Fe (mass %) | Ti (mass %) | Cu (mass %) | Mg (mass %) | Cr (mass %) | Mn/Si | Types of surface Zn layer | Number of intermetallic compounds whose sizes are 1.0 μm or more (#/mm²) |
|---|---|---|---|---|---|---|---|---|---|---|
| Ex. 1 | 0.3 | 0.11 | 0.2 | 0.1 |  |  |  | 2.7 | Thermal spraying | 1600 |
| Ex. 2 | 0.3 | 0.11 | 0.2 | 0.1 |  |  |  | 2.7 | Thermal spraying | 1600 |
| Ex. 3 | 0.3 | 0.11 | 0.2 | 0.1 |  |  |  | 2.7 | KZnF$_3$ | 1600 |
| Ex. 4 | 0.3 | 0.11 | 0.2 | 0.1 |  |  |  | 2.7 | Mixed layer A | 1600 |
| Ex. 5 | 0.3 | 0.11 | 0.2 | 0.1 |  |  |  | 2.7 | Mixture B | 1600 |
| Ex. 6 | 0.7 | 0.2 | 0.2 | 0.1 |  |  |  | 3.5 | Thermal spraying | 1800 |
| Ex. 7 | 0.6 | 0.11 | 0.2 | 0.1 |  |  |  | 5.5 | Thermal spraying | 1700 |
| Ex. 8 | 0.79 | 0.31 | 0.2 | 0.1 |  |  |  | 2.55 | Thermal spraying | 1900 |
| Ex. 9 | 0.6 | 0.2 | 0.05 | 0.1 |  |  |  | 3 | Thermal spraying | 1500 |
| Ex. 10 | 0.6 | 0.2 | 0.3 | 0.1 |  |  |  | 3 | Thermal spraying | 2500 |
| Ex. 11 | 0.6 | 0.2 | 0.2 | 0.1 |  |  |  | 3 | Thermal spraying | 1800 |
| Ex. 12 | 0.6 | 0.2 | 0.2 | 0.1 |  |  |  | 3 | Thermal spraying | 1650 |
| Ex. 13 | 0.6 | 0.2 | 0.2 | 0.1 |  |  |  | 3 | Thermal spraying | 2200 |
| Ex. 14 | 0.6 | 0.2 | 0.2 | 0.1 |  |  |  | 3 | Thermal spraying | 1650 |
| Ex. 15 | 0.6 | 0.2 | 0.2 | 0.1 |  |  |  | 3 | Thermal spraying | 2200 |
| Ex. 16 | 0.6 | 0.2 | 0.2 | 0.1 |  |  |  | 3 | Thermal spraying | 1700 |
| Ex. 17 | 0.6 | 0.2 | 0.2 | 0.1 |  |  |  | 3 | Thermal spraying | 2100 |
| Ex. 18 | 0.6 | 0.2 | 0.2 | 0.06 |  |  |  | 3 | Thermal spraying | 1800 |
| Ex. 19 | 0.6 | 0.2 | 0.2 | 0.3 |  |  |  | 3 | Thermal spraying | 1800 |
| Ex. 20 | 0.6 | 0.2 | 0.2 | 0.1 | 0.05 |  |  | 3 | Thermal spraying | 1800 |
| Ex. 21 | 0.6 | 0.2 | 0.2 | 0.1 |  | 0.04 |  | 3 | Thermal spraying | 1800 |
| Ex. 22 | 0.6 | 0.2 | 0.2 | 0.1 |  |  | 0.02 | 3 | Thermal spraying | 1800 |
| Ex. 23 | 0.6 | 0.2 | 0.2 | 0.1 |  |  |  | 3 | Thermal spraying | 2200 |
| Ex. 24 | 0.6 | 0.2 | 0.2 | 0.1 |  |  |  | 3 | Thermal spraying | 2000 |
| Ex. 25 | 0.6 | 0.2 | 0.2 | 0.1 |  |  |  | 3 | Thermal spraying | 1900 |
| Ex. 26 | 0.6 | 0.2 | 0.2 | 0.1 |  |  |  | 3 | Thermal spraying | 1500 |
| Ex. 27 | 0.6 | 0.2 | 0.2 | 0.1 |  |  |  | 3 | Thermal spraying | 2800 |
| Ex. 28 | 0.6 | 0.2 | 0.2 | 0.1 |  |  |  | 3 | Thermal spraying | 2000 |
| Ex. 29 | 0.6 | 0.2 | 0.2 | 0.1 |  |  |  | 3 | Thermal spraying | 1800 |
| Ex. 30 | 0.6 | 0.2 | 0.2 | 0.1 |  |  |  | 3 | Thermal spraying | 1500 |
| Ex. 31 | 0.6 | 0.2 | 0.2 | 0.1 |  |  |  | 3 | Thermal spraying | 1650 |

TABLE 1-continued

| | Mn (mass %) | Si (mass %) | Fe (mass %) | Ti (mass %) | Cu (mass %) | Mg (mass %) | Cr (mass %) | Mn/Si | Types of surface Zn layer | Number of intermetallic compounds whose sizes are 1.0 μm or more (#/mm$^2$) |
|---|---|---|---|---|---|---|---|---|---|---|
| Ex. 32 | 0.6 | 0.2 | 0.2 | 0.1 | | | | 3 | Thermal spraying | 2700 |
| Ex. 33 | 0.6 | 0.2 | 0.2 | 0.1 | | | | 3 | Thermal spraying | 1650 |
| Ex. 34 | 0.6 | 0.2 | 0.2 | 0.1 | | | | 3 | Thermal spraying | 2700 |
| Ex. 35 | 0.6 | 0.2 | 0.2 | 0.1 | | | | 3 | Thermal spraying | 1600 |
| Ex. 36 | 0.6 | 0.2 | 0.2 | 0.1 | | | | 3 | Thermal spraying | 2700 |
| Ex. 37 | 0.6 | 0.2 | 0.2 | 0.1 | | | | 3 | Thermal spraying | 2800 |
| Ex. 38 | 0.6 | 0.2 | 0.2 | 0.1 | | | | 3 | Thermal spraying | 2600 |
| C. Ex. 1 | 0.1 | 0.2 | 0.2 | 0.1 | | | | 0.5 | Thermal spraying | 1600 |
| C. Ex. 2 | 0.4 | 0.2 | 0.2 | 0.1 | | | | 2 | Thermal spraying | 1700 |
| C. Ex. 3 | 1 | 0.2 | 0.2 | 0.1 | | | | 5 | Thermal spraying | 1900 |
| C. Ex. 4 | 0.6 | 0.05 | 0.2 | 0.1 | | | | 12 | Thermal spraying | 1500 |
| C. Ex. 5 | 0.6 | 0.5 | 0.2 | 0.1 | | | | 1.2 | Thermal spraying | 3500 |
| C. Ex. 6 | 0.6 | 0.2 | 0.5 | 0.1 | | | | 3 | Thermal spraying | 4000 |
| C. Ex. 7 | 0.6 | 0.2 | 0.2 | 0.03 | | | | 3 | Thermal spraying | 1800 |
| C. Ex. 8 | 0.6 | 0.2 | 0.2 | 0.4 | | | | 3 | Thermal spraying | 1800 |
| C. Ex. 9 | 0.6 | 0.2 | 0.2 | 0.1 | 0.1 | | | 3 | Thermal spraying | 1800 |
| C. Ex. 10 | 0.6 | 0.2 | 0.2 | 0.1 | | 0.1 | | 3 | Thermal spraying | 1800 |
| C. Ex. 11 | 0.6 | 0.2 | 0.2 | 0.1 | | | 0.2 | 3 | Thermal spraying | 1800 |

TABLE 2

| | Homogenization temperature (° C.) | Heating rate (° C./h) Room temperature to 450° C. | Heating rate (° C./h) 450° C. to homogenization temperature | Cooling rate (° C./h) Homogenization temperature to 200° C. | Homogenization time (h) | Heating purpose | Heating temperature (° C.) | Corrosion resistance (μm) | extrudability |
|---|---|---|---|---|---|---|---|---|---|
| Ex. 1 | 600 | 100 | 40 | 200 | 12 | Zn-diffusing treatment | 600 | 80 | A |
| Ex. 2 | 600 | 100 | 40 | 200 | 12 | Zn-diffusing treatment | 400 | 80 | A |
| Ex. 3 | 600 | 100 | 40 | 200 | 12 | Brazing | 600 | 80 | A |
| Ex. 4 | 600 | 100 | 40 | 200 | 12 | Brazing | 600 | 80 | A |
| Ex. 5 | 600 | 100 | 40 | 200 | 12 | Brazing | 600 | 80 | A |

TABLE 2-continued

|  | Homogenization temperature (° C.) | Heating rate (° C./h) | | Cooling rate (° C./h) Homogenization temperature to 200° C. | Homogenization time (h) | Heating purpose | Heating temperature (° C.) | Corrosion resistance (μm) | extrudability |
|---|---|---|---|---|---|---|---|---|---|
|  |  | Room temperature to 450° C. | 450° C. to homogenization temperature |  |  |  |  |  |  |
| Ex. 6 | 600 | 100 | 40 | 200 | 12 | Brazing | 600 | 70 | B |
| Ex. 7 | 600 | 100 | 40 | 200 | 12 | Brazing | 600 | 65 | B |
| Ex. 8 | 600 | 100 | 40 | 200 | 12 | Brazing | 600 | 75 | B |
| Ex. 9 | 600 | 100 | 40 | 200 | 12 | Brazing | 600 | 50 | B |
| Ex. 10 | 600 | 100 | 40 | 200 | 12 | Brazing | 600 | 100 | A |
| Ex. 11 | 600 | 100 | 40 | 200 | 12 | Brazing | 600 | 70 | B |
| Ex. 12 | 600 | 50 | 10 | 200 | 12 | Brazing | 600 | 70 | B |
| Ex. 13 | 600 | 50 | 80 | 200 | 12 | Brazing | 600 | 90 | B |
| Ex. 14 | 600 | 180 | 10 | 200 | 12 | Brazing | 600 | 70 | B |
| Ex. 15 | 600 | 180 | 80 | 200 | 12 | Brazing | 600 | 90 | B |
| Ex. 16 | 600 | 100 | 40 | 50 | 12 | Brazing | 600 | 70 | B |
| Ex. 17 | 600 | 100 | 40 | 400 | 12 | Brazing | 600 | 90 | B |
| Ex. 18 | 600 | 100 | 40 | 200 | 12 | Brazing | 600 | 75 | B |
| Ex. 19 | 600 | 100 | 40 | 200 | 12 | Brazing | 600 | 65 | B |
| Ex. 20 | 600 | 100 | 40 | 200 | 12 | Brazing | 600 | 75 | B |
| Ex. 21 | 600 | 100 | 40 | 200 | 12 | Brazing | 600 | 70 | B |
| Ex. 22 | 600 | 100 | 40 | 200 | 12 | Brazing | 600 | 70 | B |
| Ex. 23 | 600 | 100 | 40 | 200 | 4 | Brazing | 600 | 90 | A |
| Ex. 24 | 600 | 100 | 40 | 200 | 8 | Brazing | 600 | 80 | A |
| Ex. 25 | 600 | 100 | 40 | 200 | 16 | Brazing | 600 | 75 | B |
| Ex. 26 | 600 | 100 | 40 | 200 | 20 | Brazing | 600 | 65 | B |
| Ex. 27 | 450 | 100 | 40 | 200 | 2 | Brazing | 600 | 95 | A |
| Ex. 28 | 450 | 100 | 40 | 200 | 24 | Brazing | 600 | 75 | B |
| Ex. 29 | 650 | 100 | 40 | 200 | 2 | Brazing | 600 | 80 | B |
| Ex. 30 | 650 | 100 | 40 | 200 | 24 | Brazing | 600 | 65 | B |
| Ex. 31 | 600 | 40 | 5 | 200 | 12 | Brazing | 600 | 70 | C |
| Ex. 32 | 600 | 40 | 100 | 200 | 12 | Brazing | 600 | 150 | B |
| Ex. 33 | 600 | 190 | 5 | 200 | 12 | Brazing | 600 | 70 | C |
| Ex. 34 | 600 | 190 | 100 | 200 | 12 | Brazing | 600 | 150 | B |
| Ex. 35 | 600 | 100 | 40 | 20 | 12 | Brazing | 600 | 70 | C |
| Ex. 36 | 600 | 100 | 40 | 500 | 12 | Brazing | 600 | 140 | B |
| Ex. 37 | 430 | 100 | 40 | 200 | 2 | Brazing | 600 | 120 | C |
| Ex. 38 | 430 | 100 | 40 | 200 | 12 | Brazing | 600 | 150 | C |
| C. Ex. 1 | 600 | 100 | 40 | 200 | 12 | Brazing | 600 | 270 | A |
| C. Ex. 2 | 600 | 100 | 40 | 200 | 12 | Brazing | 600 | 170 | A |

TABLE 2-continued

| Homogenization temperature (° C.) | Heating rate (° C./h) | | Cooling rate (° C./h) Homogenization temperature to 200° C. | Homogenization time (h) | Heating purpose | Heating temperature (° C.) | Corrosion resistance (μm) | extrudability |
|---|---|---|---|---|---|---|---|---|
| | Room temperature to 450° C. | 450° C. to homogenization temperature | | | | | | |
| C. Ex. 3 | 600 | 100 | 40 | 200 | 12 | Brazing | 600 | 50 | D |
| C. Ex. 4 | 600 | 100 | 40 | 200 | 12 | Brazing | 600 | 70 | D |
| C. Ex. 5 | 600 | 100 | 40 | 200 | 12 | Brazing | 600 | 320 | D |
| C. Ex. 6 | 600 | 100 | 40 | 200 | 12 | Brazing | 600 | 370 | A |
| C. Ex. 7 | 600 | 100 | 40 | 200 | 12 | Brazing | 600 | 160 | B |
| C. Ex. 8 | 600 | 100 | 40 | 200 | 12 | Brazing | 600 | 70 | D |
| C. Ex. 9 | 600 | 100 | 40 | 200 | 12 | Brazing | 600 | 250 | D |
| C. Ex. 10 | 600 | 100 | 40 | 200 | 12 | Brazing | 600 | 170 | D |
| C. Ex. 11 | 600 | 100 | 40 | 200 | 12 | Brazing | 600 | 170 | D |

The test samples of Comparative Examples 1 and 2 (C. Ex 1 and C. Ex 2) indicated in Tables 1 and 2 were test samples in which the ratios of the Mn content to the Si content (Mn %/Si %) were 0.5 and 2, respectively. In the test samples of Comparative Examples 1 and 2, corrosion resistance was reduced since their ratios of the Mn content to the Si content were lower than 2.5.

The test sample of Comparative Examples 3 (C. Ex 3) indicated in Tables 1 and 2 was the test sample including an excessive amount of Mn. In the test sample of Comparative Example 3 (C. Ex 3), extrudability was reduced. The test sample of Comparative Example 4 (C. Ex 4) was the test sample including an insufficient amount of Si. In the test sample of Comparative Example 4, extrudability was reduced.

The test samples of Comparative Example 5 (C. Ex 5) indicated in Tables 1 and 2 was the test sample in which an excessive amount of Si was included and the ratio of the Mn content to the Si content was 1.2. In the test sample of Comparative Example 5, corrosion resistance was reduced and there was a problem on extrudability.

The test samples of Comparative Example 6 (C. Ex 6) indicated in Tables 1 and 2 was the test sample including an excessive amount of Fe. In the test sample of Comparative Example 6, corrosion resistance was reduced. The test samples of Comparative Example 7 (C. Ex 7) indicated in Tables 1 and 2 was the test sample including an insufficient amount of Ti. In the test sample of Comparative Example 7, corrosion resistance was reduced. In the test sample of Comparative Example 8 (C. Ex 8), which was the test sample including an excessive amount of Ti, extrudability was reduced.

In the test sample of Comparative Example 9 (C. Ex 9) in Tables 1 and 2, there were problems of the deteriorated corrosion rate and occurrence of grain boundary corrosion due to excessive addition of Cu.

In the test sample of Comparative Examples 10 and 11 (C. Ex 10 and C. Ex 11) indicted in Tables 1 and 2, since both of Mg and Cr increase deformation resistance during extrusion, the selective corrosion problem in the weld part occurred because of increased extrusion pressure by the excessive addition of these elements. In the case where the added elements were segregated in the weld part in the extruded heat transfer tube, the selective corrosion occurred in the shape tracing the weld line.

Contrary to the above-explained test samples of Comparative Examples, each test sample in Examples 1-38 (Ex 1-Ex 38) had excellent corrosion resistance and there was no problem on extrudability.

However, in the test samples of Examples 31-34 (Ex 31 and Ex 34), there was a slight problem on extrudability on the aspect of the extrusion pressure; and corrosion resistance was a bit reduced. The test samples of Examples 31-34 were the test samples, in which the heating rate from the room temperature to 450° C. was set to 40° C./h or 190° C./h; or the test samples, in which the heating rate from 450° C. to the homogenization treatment temperature was set to 5° C./h or 100° C./h in the homogenization treatment.

The test samples of Examples 35 and 36 (Ex 35 and Ex 36) were the test samples in which the cooling rate from the homogenization treatment temperature to 200° C. was set to 20° C./h or 500° C./h. In the samples of Examples 35 and 36, there was a slight problem on extrudability on the aspect of the extrusion pressure; and corrosion resistance was a bit reduced.

Based on the above-described observation, it was interpreted that preferentially, the heating rate from room temperature to 450° C. was set to 50-180° C./h; and the heating rate from 450° C. to the homogenization treatment temperature was set to 10-80° C./h in the homogenization treatment. Also, it is interpreted that the cooling rate from the homogenization treatment temperature to 200° C. was set to 50-400° C./h.

The test samples of Examples 37 and 38 (Ex 37 and Ex 38) were the samples in which the temperature of the homogenization treatment was set to 430° C. In Examples 37 and 38, corrosion resistance was a bit reduced and there was a slight problem in extrudability based on the condition on the surfaces of the flat extruded tubes. Because of this, it was interpreted that the performing the homogenization treatment at 450° C. or higher was preferable.

INDUSTRIAL APPLICABILITY

According to the present invention, an extruded tube with excellent corrosion resistance, in which selective corrosion at the extrusion weld part is suppressed, can be provided. In addition, by using the heat transfer tube whose body is this extruded tube, a heat exchanger with excellent corrosion resistance can be provided.

The invention claimed is:

1. A method of producing an extruded heat transfer tube with an internal passage, the extruded heat transfer tube having a tube body having a composition including: 0.3 mass % or more and less than 0.8 mass % of Mn; more than 0.1 mass % and less than 0.32 mass % of Si; 0.3 mass % or less of Fe; 0.06 mass % or more and 0.3 mass % or less of Ti; less than 0.03 mass % of Cr; and Al balance including inevitable impurities, a ratio of a Mn content to a Si content, Mn %/Si %, exceeding 2.5; and a Zn-containing layer provided directly on an outer surface of the tube body, the method comprising the step of performing a homogenization treatment in which an ingot of the aluminum alloy having the composition is kept at a temperature of 450-650° C. for 2-24 hours after being casted, wherein the tube body has weld lines, wherein 3000/mm$^2$ or less of intermetallic compound precipitates whose size is 1.0 μm or more in a circle equivalent diameter are precipitated in the heat transfer tube after a brazing heat treatment or a Zn diffusing treatment of the heat transfer tube, and a heating rate from 26° C. to 450° C. is 50-180° C./h; a heating rate from 450° C. to a temperature of the homogenization treatment is 10-80° C./h; and a cooling rate from the temperature of the homogenization treatment to 200° C. is 50-400° C./h, in the homogenization treatment.

2. The method of producing an extruded heat transfer tube according to claim 1, wherein the composition of the tube body has the ratio, Mn %/Si %, being 5.5 or less.

* * * * *